United States Patent
Mager (10) Patent No.: US 8,667,512 B2
(45) Date of Patent: *Mar. 4, 2014

(54) FLEXIBLE HIERARCHICAL SETTINGS REGISTRY FOR OPERATING SYSTEMS

(75) Inventor: Michael Mager, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 746 days.

This patent is subject to a terminal disclaimer.

(21) Appl. No.: 12/551,498

(22) Filed: Aug. 31, 2009

(65) Prior Publication Data

US 2010/0138844 A1 Jun. 3, 2010

Related U.S. Application Data

(60) Provisional application No. 61/109,380, filed on Oct. 29, 2008.

(51) Int. Cl.
*G06F 9/44* (2006.01)

(52) U.S. Cl.
USPC .......................................... 719/328; 717/121

(58) Field of Classification Search
None
See application file for complete search history.

(56) References Cited

U.S. PATENT DOCUMENTS

| | | | | |
|---|---|---|---|---|
| 5,903,753 | A * | 5/1999 | Bramnick et al. | 719/328 |
| 6,347,331 | B1 * | 2/2002 | Dutcher et al. | 709/203 |
| 6,446,255 | B1 * | 9/2002 | Curtis et al. | 717/121 |
| 6,496,979 | B1 * | 12/2002 | Chen et al. | 717/178 |
| 6,779,179 | B1 * | 8/2004 | Romm et al. | 717/178 |
| 6,917,958 | B1 * | 7/2005 | Howe et al. | 709/203 |
| 7,739,283 | B2 * | 6/2010 | Shawver et al. | 707/736 |
| 8,046,831 | B2 * | 10/2011 | Porter et al. | 726/22 |
| 2002/0073072 | A1 * | 6/2002 | Fukumoto | 707/1 |
| 2002/0129054 | A1 * | 9/2002 | Ferguson et al. | 707/503 |
| 2005/0050084 | A1 * | 3/2005 | Atm | 707/102 |
| 2005/0091658 | A1 | 4/2005 | Kavalam et al. | |

(Continued)

FOREIGN PATENT DOCUMENTS

| | | |
|---|---|---|
| CN | 1601465 A | 3/2005 |
| JP | 2005078628 A | 3/2005 |
| JP | 2005129066 A | 5/2005 |

OTHER PUBLICATIONS

Anonymous: "Access Control List" [Online] Oct. 28, 2008, pp. 1-2, XP002560894 Retrieved from the Internet: URL: http://en.wikipedia.org/w/index.php"title=Access_control_list&oldid=248183235> [retrieved on Dec. 17, 2009].

(Continued)

*Primary Examiner* — Emerson Puente
*Assistant Examiner* — Hiren Patel
(74) *Attorney, Agent, or Firm* — James T. Hagler (57) ABSTRACT

Various embodiments include methods and systems provide a distributed settings registry with access protection definable by application developers. Distributed settings registry may be implemented across different technologies with customizable privileges and the dynamic ability to plug different nodes into the registry tree. The settings registry may exist under a registry interface so the applications invoking the registry need not be concerned with where or how the settings data is stored. Each node in the tree of the registry may define its own privilege requirements and storage technology. Nodes may be "native" (i.e., fully supported within the setting registry system software) or "non-native" (i.e., defined by developers for specific applications).

20 Claims, 7 Drawing Sheets

(56) References Cited

U.S. PATENT DOCUMENTS

| | | | | |
|---|---|---|---|---|
| 2005/0246704 A1* | 11/2005 | Romm et al. | | 717/178 |
| 2006/0174223 A1* | 8/2006 | Muir et al. | | 717/106 |
| 2007/0094667 A1* | 4/2007 | Bissett et al. | | 718/104 |
| 2007/0245409 A1* | 10/2007 | Harris et al. | | 726/5 |
| 2009/0106780 A1* | 4/2009 | Nord et al. | | 719/329 |

OTHER PUBLICATIONS

International Search Report and Written Opinion—PCT/US2009/062494, International Search Authority—European Patent Office—Jan. 4, 2010.

"ISettings," downloaded from http://qwiki.qualcomm.com/qct-ipa/ISettings on Dec. 20, 2012.

* cited by examiner fs:/~0xdeadbeef/foo.ini

[General]
name=Mike

```
ISettings *pSettings = NULL;
char buf[32];
ISettingsStoreFactory_Create(pFactory, "owner=0xdeadbeef;file=foo.ini", &pSettings);
ISettings_Get(pSettings, "General/name", buf, sizeof(buf), NULL);
```

Fig. 1 fs:/mod/foo/foo.ini

```
[General]
name=Mike
```
2 foo.cif

```
local s = require 'SettingsCIFHelpers'
s:RegisterIniFile {
   owner = 0xdeadbeef,
   key = "/fooApp",
   file = "foo.ini",
   acls = {
      { -- ACLs for the root node
         {
            groups = {AEECLSID_BarApp},
            perms = "rw/rw",
         },
         path = "/fooApp"
      },
   },
}
```
6

```
char buf[32];
ISettings_Get(pSettings, "/fooApp/General/name", buf, sizeof(buf),
NULL);
```
8

Fig. 2

Fig. 3 bmpsettings.cif

```
local s = require 'SettingsCIFHelpers'
s:RegisterClass {
   class = AEECLSID_BMPSettings,
   key = "/bmp",
}
```
22 bmpsettings.c

```
int BMPSettings_Get(...)
{
   if (0 == std_strcmp(cpszKey, "/bmp/version")) {
      char version[] = "1.0 rev 01.05";
      if (pnValueLenReq != NULL) {
         *pnValueLenReq = sizeof(version);
      }
      if (pszValue != NULL && nValueLen >= sizeof(version)) {
         std_memmove(pszValue, version, sizeof(version));
      }
      return AEE_SUCCESS;
   }
}
```
24

```
char buf[32];
ISettings_Get(pSettings, "/bmp/version", buf, sizeof(buf), NULL);
```
26

FLEXIBLE HIERARCHICAL SETTINGS REGISTRY FOR OPERATING SYSTEMS

RELATED APPLICATIONS

This application claims the benefit of priority to U.S. Provisional Patent Application No. 61/109,380 entitled "Flexible Hierarchical Settings Registry for Operating Systems" filed Oct. 29, 2008, the entire contents of which are hereby incorporated by reference.

FIELD OF INVENTION

This invention generally relates to computer operating systems, and more particularly to registry systems implemented on operating systems for mobile computing devices.

BACKGROUND

A registry is a directory for storing settings and options for software operating within an operating system. For example, the Windows® operating systems by Microsoft Corporation includes a directory file known as the Windows registry which contains the information and settings that are required by hardware, operating system software, and application software, as well as storing user preferences and settings. A registry file serves to locate all program and hardware settings and constant values in a single file structure.

The Windows registry contains two basic elements: keys and values. Registry keys are similar to file folders. In addition to values, each key can contain subkeys which may contain further subkeys. Keys are referenced in a syntax similar to Windows path names using backslashes to indicate levels of hierarchy. Registry values are name/data pairs stored within keys. Values are referenced separately from keys. In the Windows registry, values can be string values, binary data, unsigned 32-bit integers, UNICODE values, multi-string values, lists and 64-bit integer values (in Windows 2000 and later). The Windows registry is constructed as a database offering database-type functions.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In this description, the terms "example" and "exemplary" are used to mean "serving as an example, instance, or illustration." Any implementation described herein as an "example" or "exemplary" is not necessarily to be construed as preferred or advantageous over other implementations.

As used herein, the terms "mobile handsets" and "mobile devices" are used interchangeably and refer to any one of various cellular telephones, personal data assistants (PDA's), palm-top computers, laptop computers with wireless modems, wireless electronic mail receivers (e.g., the Blackberry® and Treo® devices), cellular telephones, and multimedia Internet enabled cellular telephones (e.g., the Blackberry Storm®), and similar personal electronic devices. A mobile device may include a programmable processor and memory as described more fully below with reference to FIG. 7.

Modern mobile devices can store vast quantities of digital information and users typically use their mobile devices as information and entertainment appliances. Consequently the complexity and sophistication of applications developed for mobile devices now rivals those developed for personal computers. The various embodiments facilitate the development of mobile device applications by providing a flexible settings registry with definable access protection.

The various embodiments provide a distributed settings registry with access protection definable by application developers. Distributed settings registry provides across different technologies with customizable privileges and the dynamic ability to plug different nodes into the registry tree. The settings registry may exist under a registry interface so the applications invoking the registry need not be concerned with where or how the settings values are stored. Each node in the tree of the registry may define its own privilege requirements and storage technology. Nodes may be "native" (i.e., fully supported within the setting registry system software) or "non-native" (i.e., defined by developers for specific applications). Settings objects register themselves with the settings registry via the module information file (mif) which is referred to herein as the .mif file.

As is well known, applications resident on mobile devices may be defined by two files; the module information file, with extension .mif, and the module file, with extension .mod. If the application requires settings information, such settings values may be stored within the settings registry for access by the application when it is started or running. As an example, settings may be stored in an initialization file with a .ini file extension. In such an implementation, a developer must provide the .mod file containing the compiled application code, the .mif file containing the compiled module information (including the settings registration information), and the .ini file containing the settings values.

The various embodiments provide an application programming interface (API), sometimes referred to herein as ISettings, and a settings registry implementation of the API, sometimes referred to herein as "SettingsReg," which enable getting/setting named keys with string values, support hierarchical key structures, allow enumerating over trees of keys, and support notifications when values change. Data may be stored in the settings registry as text files which simplifies read, write and enumeration operations. An embodiment of the SettingsReg provides two types of functionality, public settings and private settings. Public settings are setting files that an application or component wishes to make available to the rest of the system via a global settings registry. Public settings are generally available to all applications running within the operating system. Private settings are setting files that are available to selectively identified applications, or types or classifications of applications.

The settings registry of the various embodiments utilizes a URI-based settings tree, e.g. "/path/to/a/setting." Instead of being a large, monolithic registry such as is the case for the Windows registry, the settings registry of the various embodiments is comprised of several smaller sub-registries provided by any number of modules that simply "plug in" to the top-level registry, where each sub-registry "owns" a specific part of the tree. This structure enables the settings registry to be easy to maintain as each sub-registry manages its own data store in a customizable manner. The structure also allows various types of data storage mechanisms to be scalable as it is easy to add new sub-registries. The structure also provides for definable security as each sub-registry can manage its own privileges convention. Further, the structure supports change notifications across apps/domains.

The settings registry has the notion of native and non-native data stores. Native stores are those for which the ISettings registry has built-in support. For example, in an embodiment, the settings registry supports .ini file based data stores, which are settings that live in .ini files and are persisted in the extended file systems (EFS), and heap based data stores, which are settings that live in heap memory and are not persisted across power (i.e., system on/off) cycles. Non-native stores are standalone implementations that use a different storage technology or file type than those supported by native settings object data stores. Developers are free to define non-native settings objects including enforcement of privileges for those objects.

With native stores, components claim ownership of a particular node of the tree in their .mif file, where they also provide some information to the registry about their store (e.g. for a .ini file-based store, the component would specify the store type—in this case .ini-based—and the EFS path to the .ini file). The registry will manage all operations on the data store (in the case of a .ini file, the registry is the only component that ever reads/writes the file), so there is a separate mechanism, such as a settings access control list (ACL) by which a component may define privileges to allow or deny access to their store. A settings ACL (access control list) works exactly the same as a file system (FS) ACL.

With native stores there is no code to write to define/manage the store. In a native store, the registry process has the ability to create and interact with the store. A developer can simply register the store in the .mif file and provide the storage media (e.g. an .ini file). In other words modules "register" themselves with the settings registry via the .mif file. Applications using the store can then use the ISettings interface along with the defined keys to access the data (assuming the application has the privilege to do so). All accesses to individual native settings objects are then performed by a singleton service 18 (see FIG. 3). In other words, the same service accesses all native settings objects 20 are accessed by the same service in a process that is separated by a process boundary from the application 10, 14 and the API 12, 16 called to obtain the information.

Setting data are stored as setting objects. An object generating API, referred to herein as a settings store factory may be used to create a native setting registry object around a particular storage technology. For example, in a first embodiment two settings store factories are provided, one for generating .ini file setting objects, and one for generating heap storage setting objects. As is well known, .ini files are initialization files which are used by applications to store configuration data that is read as the program is starting, and heap storage are files stored in temporary memory which are deleted whenever the mobile device is powered down.

Settings store factories may be used in particular when the information to be stored is to be given limited access, i.e., is "private," with access limited to named applications, or types or families of applications. As used herein, the term "public" refers to any setting that is available in the setting registry, regardless of the access privileges, is considered public, and the term "private" refers to settings or objects that are created in an application using the factory. In this regard, "private" settings refer to an instance of an object that is created in the context of a single application, which is then a "private" instance to that application. So if two applications both open the same .ini file using the settings .ini factory, each application now has a private instance of that object (in this case the applications that have access to the file may be defined by some mechanism other than the settings registry, e.g. a file system ACL). When one application makes a change, there may be no way of notifying the other application that a change has occurred. On the other hand, if that .ini file was registered with the settings registry, which makes it "public," then both applications could access the data in that .ini file by going through the settings registry, and when one application makes a change, the other application could be notified. Thus, there may be three classifications of settings objects: public, available to all; public, with limited access; and private.

Figure 1:
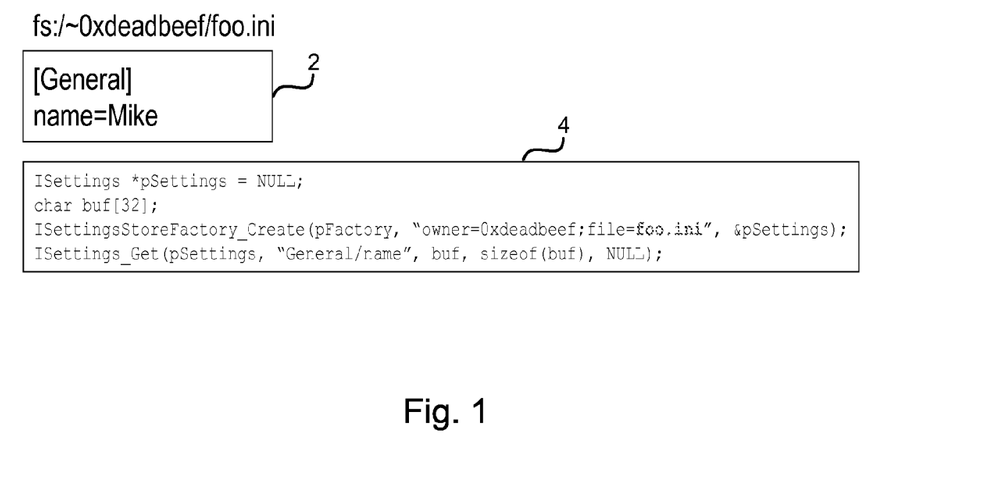
FIG. 1 provides example code blocks for implementing settings objects within an embodiment.

FIG. 1 illustrates a sample of example code that can be used to implement an .ini file for the program "foo". In this example, the information to be stored in a foo.ini at the tree and file fs:/~0xdeadbeef/foo.ini is the name "Mike" to be stored in the "name" node (see code 2). The script used to implement a settings store factory for generating this foo.ini setting file is illustrated in code block 4. In the line beginning with "ISettingsStoreFactory_Create" the developer specifies the node name to be used ("foo.ini" in the example).

During the generation of the native settings object the developer can also designate whether the object is private or public, as those discussed above. If the developer designates the object as private, the developer may also designate the object's access privileges, i.e., the particular applications or application types that may access the settings object. In example code illustrated in FIG. 2, the line of code "ISettings_Get(pSettings, 'Genera/name', buf, sizeof (buf), NULL)" will return the data stored in the foo.ini file at node "name", which in this example is "Mike." Such .ini files may be subject to FS ACLs which are privileges specified in the settings object in the form of a list of applications to which the registry system can permit access to the settings value. Privileges can be specified within a settings object such that some settings values within the object are public (i.e., accessible by any application) while other settings values within the same object are private and accessible only by applications or application types identified in the corresponding ACL.

Figure 2:
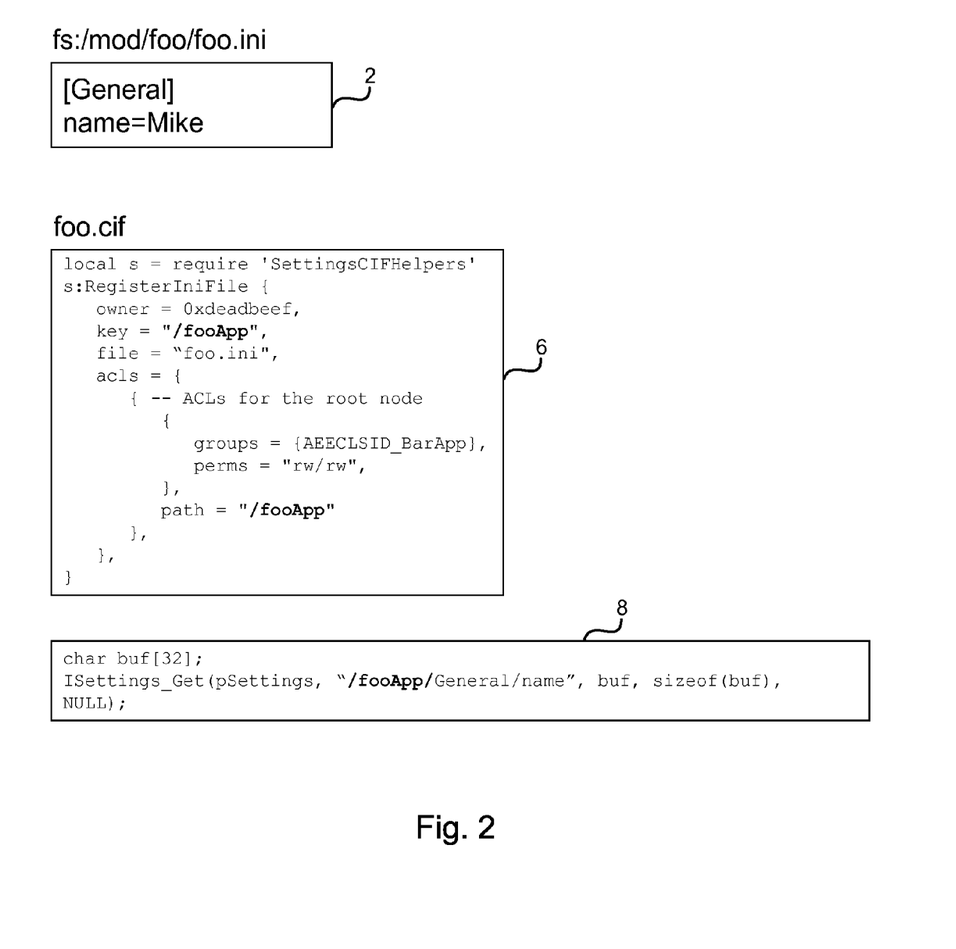
FIG. 2 provides further example code blocks for implementing native settings objects within an embodiment.

Having generated a native node setting object using the script shown in FIG. 1, a developer can register the object 2 with the settings registry by implementing the script shown in the .cif file block 6 in FIG. 2. The .cif file is compiled to generate the .mif file for an application. Thus, the code in block 6 defines the information that will be present in the .mif file for application "fooApp" which defines the settings object "foo.ini" that will hold the initialization settings including the word "Mike" in the "name" node. The system can enumerate the .mif files stored on the mobile device to determine the key for the settings file. In particular, the .mif file (defined by the code in the .cif file 6) needs to define the owner, the key and the file (see the third through fifth lines in block 6). Once the object is registered, the information can be accessed by an application by implementing the script shown in block 8 in FIG. 2.

As mentioned above and as illustrated in FIG. 3, the settings registry implements a singleton service 18 for accessing all native settings objects 20. This enables the establishment of a process boundary (illustrated as a dashed line) between the processing of applications 10, 14 and registry 12, 16 (above the dashed line) and the accesses to the settings objects 20. The native settings access API 12, 16 called by applications 10, 14 need not specify the file location or include specifics related to the file structure implemented with the settings objects; such details are handled by the singleton service 18.

Figure 3:
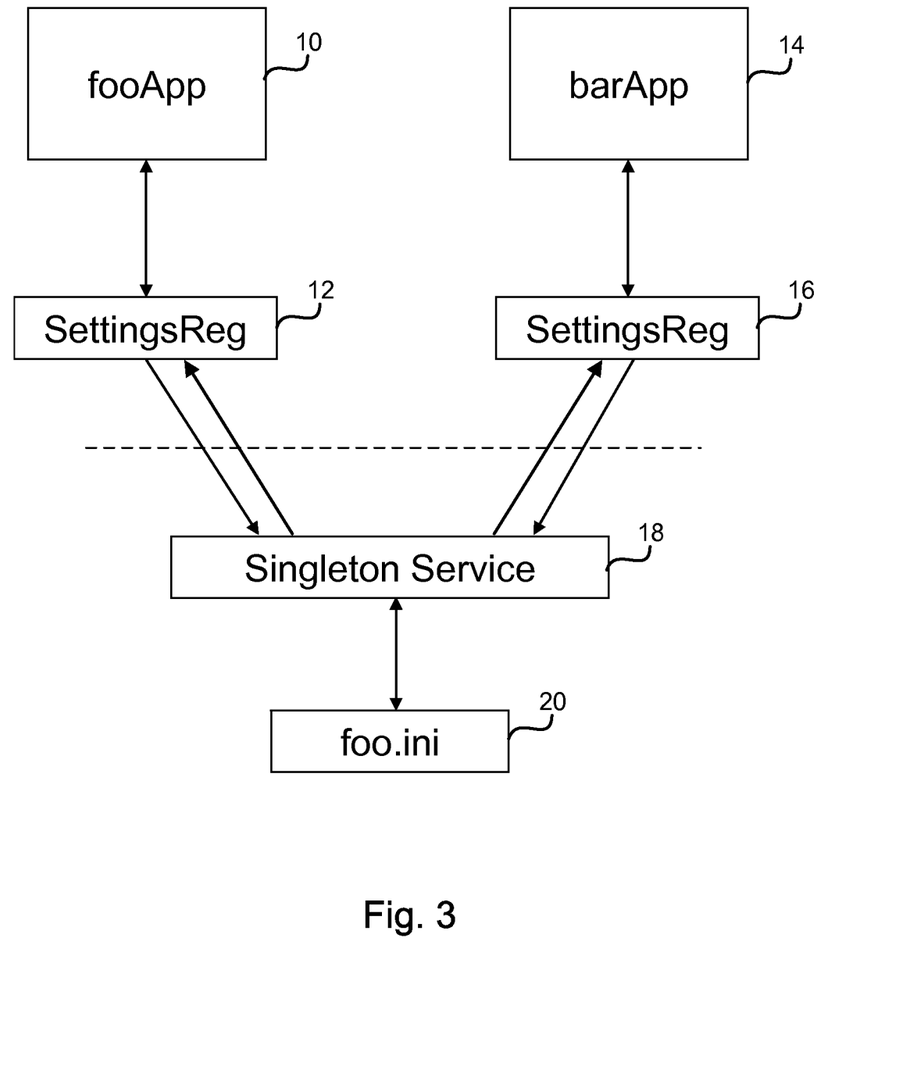
FIG. 3 is a process call diagram illustrating process calls for a native settings object by two applications.

Non-native stores are data storage mechanisms for which the registry does not have native support (i.e., there is no settings factory provided and the singleton service 18 is not configured to access the settings object file type). The various embodiments of the settings registry allow non-native stores to install themselves into the tree and handle any operations that occur on the nodes within that tree. Depending on the non-native store implementation, the operations on the store may be performed in-process or across a process boundary.

Like native stores, non-native stores register in their .mif file to "own" a particular node of the tree. The difference is that non-native stores provide a class ID for a custom ISettings class. With non-native stores, the caller first instantiates the registry class. When an operation is made on a key in the tree owned by the non-native store, the custom class is instantiated (assuming the caller has the appropriate privilege) and the operation is delegated to it. In this case, the registry essentially operates as a "pass-through." Technically, the caller could get the same functionality by instantiating the custom class directly instead of the registry, but using the registry simplifies the usage, especially when the caller is interested in both native and non-native stores.

Figure 4:
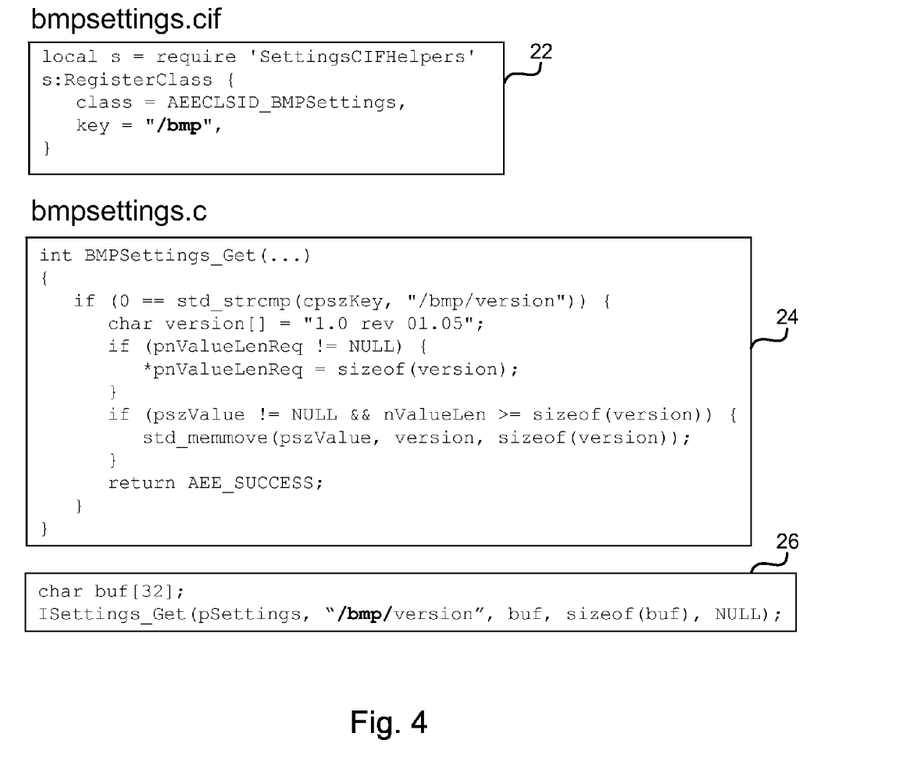
FIG. 4 provides example code blocks for implementing non-native settings objects within an embodiment.

A developer can register a non-native node by implementing scripts such as the example illustrated in FIG. 4 for the non-native "BMPSettings." A non-native settings object can be defined in a .cif file such as illustrated in the code in block 22. The processing for the defined non-native settings object may be implemented by including code such as illustrated in block 24. Upon instantiation, the registry process in an embodiment (e.g., SettingsReg) builds a list of registered non-native nodes in the system. Once defined and implemented, a non-native settings object can then be accessed within an application by including code similar to that illustrated in block 26. Upon an access call to a non-native node, the implementation is created and the operation delegated to that implementation.

Figure 5:
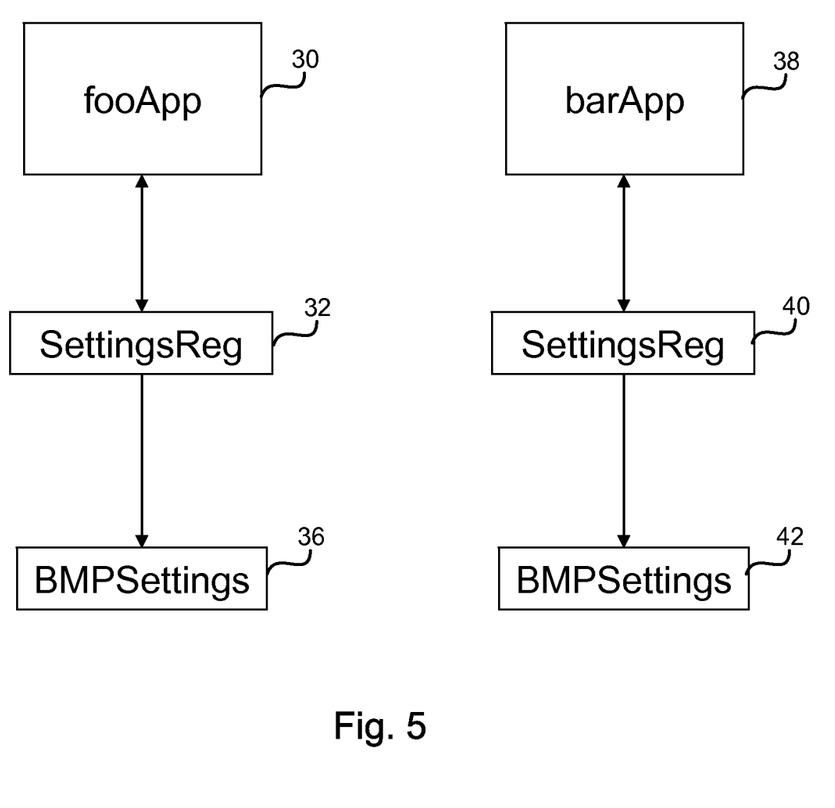
FIG. 5 is a process call diagram illustrating process calls for a non-native settings object by two applications.

Since non-native settings objects are defined by developers and thus cannot be handled by the settings registry, their access calls may be handled in-process or across a process boundary, depending on the non-native store implementation. This is illustrated in FIG. 5. When any application 30, 38 calls the settings API 32, 40 for a non-native settings object 36, 42 (e.g., BMPSettings), the API implements the non-native objects access code 36, 42 to obtain the requested information in-process (i.e., within the same process boundary without implementing the registry's singleton service 18). In this manner, developers have full freedom to define new settings objects in whatever manner and file type desired for particular applications.

Figure 6:
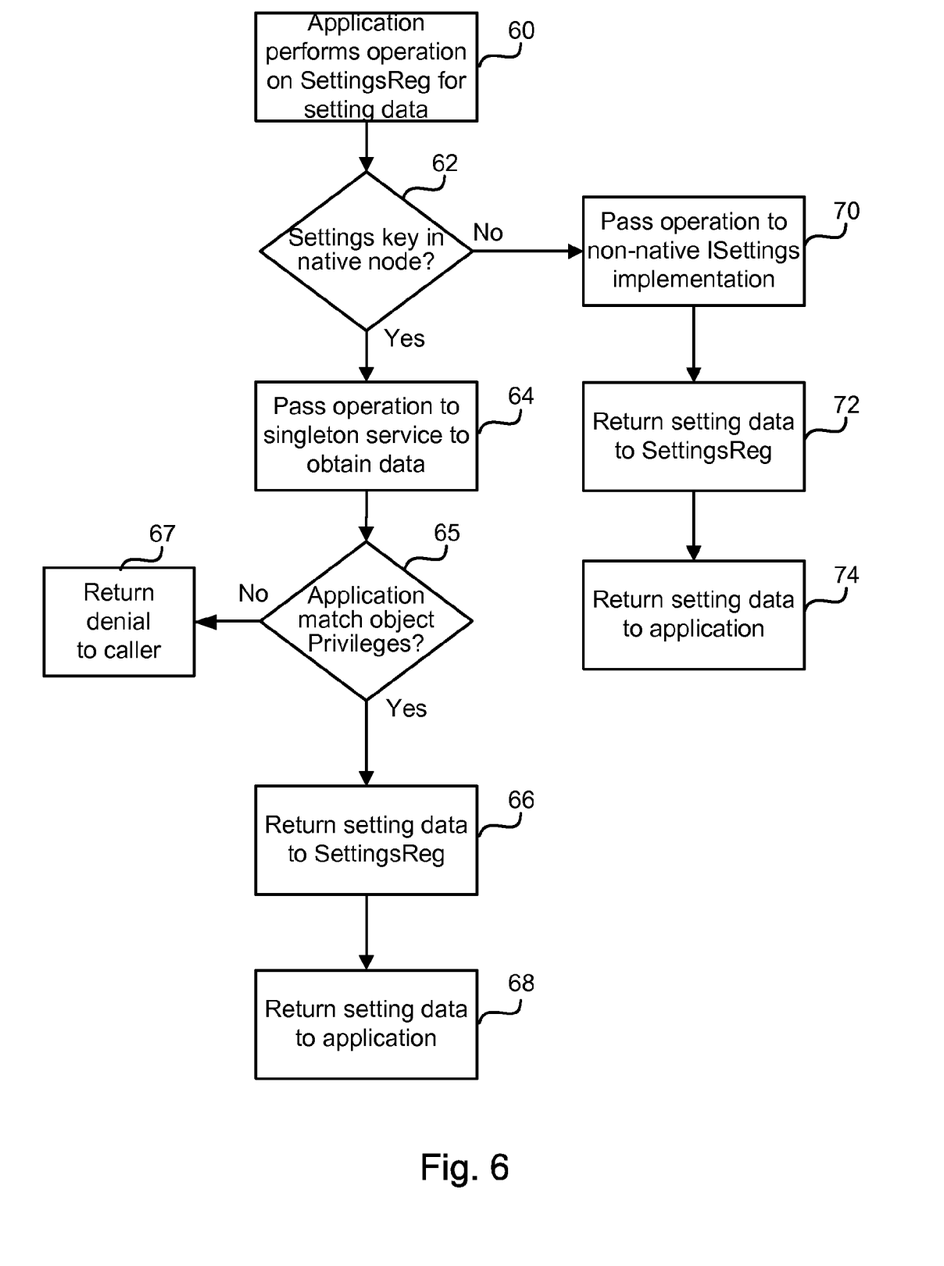
FIG. 6 is a process flow diagram illustrating processing of setting object calls within an embodiment.

Processing of application calls for settings information under the various embodiments is illustrated in FIG. 6. During initialization (or any other time) an application may request settings information by performing an operation on the settings registry via the ISettings API, step 60. For example, as illustrated in FIGS. 3 and 5, the application may access "SettingsReg" via the ISettings API as illustrated in FIG. 2 code block 8 and FIG. 4, code block 26. SettingsReg determines whether the requested settings object is to a native or non-native node, test 62. If the request is for information at a native node (i.e., test 62="Yes"), SettingsReg passes the operation to the singleton service, step 64, which accesses the indicated settings object and returns the data to SettingsReg, step 66. In an embodiment the singleton service may compare the access privileges specified in the called settings object to determine if the calling application is authorized to access the settings information, test 65. If the calling application does not satisfy the settings object privileges list (i.e., the application or application type does not match the privileges specified in the settings object and thus test 65="No"), the singleton service may return an 'access denied' or similar message to the caller, step 67. If the calling application satisfies the settings object privileges list (i.e., test 65="Yes"), SettingsReg then returns the requested data to the application, step 68. However, if the request is for information at a non-native node (i.e., test 62="No"), the SettingsReg creates the setting object for the called non-native node in-process by passing the operation to the non-native ISettings implementation, step 70, which returns the requested data, step 72. SettingsReg then returns the requested data to the application, step 74.

Developers can use the various embodiments to simplify the development of applications. The following paragraphs describe steps and example code that developers can include in applications to implement the various embodiments of setting registry.

In order to differentiate the sub-registries at the root level of the registry, each must have a unique string identifier. This simplest way to achieve this is to require a class ID, e.g.

"/~0x12345678/foo/ . . . "<- - - settings sub-registry for component 1

"/~0xdeadbeef/bar/ . . . "<- - - settings sub-registry for component 2

However, class IDs are not required; more human-readable Uniform Resource Identifiers (URIs) are allowed as well, though care must be taken to avoid overlap. If overlap occurs, the behavior may be undefined.

"/component1/foo/ . . . "

"/component2/bar/ . . . "

Private settings are settings that are available to an application or component on a per-instance basis. These settings are not exposed to any other component in the system. The ISettings support for private settings simply provides a convenient mechanism for organizing settings.

Private settings are created using a factory. The caller specifies some information about the medium from which to create the settings and the factory returns an ISettings object that can be used to access the settings.

For private settings, no modification to the .mif file is required. The component simply uses the factory to create the ISettings object of interest at run time.

In an embodiment, the settings registry includes factories that return ISettings objects which do not support the ISettings_OnChange( )method.

To add a public store of a public .ini file developers can perform the following steps to add and access a public .ini file-based settings store to their component. First developers can copy the following into a file called mysettings.ini and place it into their component's module directory in EFS:

[section1]
setting1=value1

Second, developers can register the store with the system by adding the following to the component's .cif file using script such as:

```
local s = require 'SettingsCIFHelpers'
-- register the settings at "/myApp/myIniSettings/..."
s:RegisterIniFile {
    owner = 0x12345678,      -- class ID of the component
    key = "/myApp/myIniSettings",
    file = "mysettings.ini",
    acls = { ... }           -- optional
}
```

Third, developers can, optionally, define ACLs to allow other apps access to the settings:

```
acls = {
    {   -- grant everyone read access to my settings but write
        -- access to only those modules belonging to the
        0xdeadd00d group
        {
            groups = { 0 },
            perms = "r/r",
        },
        {
            groups = { 0xdeadd00d },
            perms = "rw/rw",
        },
        path = "/myApp/myIniSettings"
    },
}
```

Fourth, developers can use the following code within an application to access the setting:

```
{
    ISettings *piSettings = NULL;
    if (SUCCESS == IEnv_CreateInstance(piEnv,
    AEECLSID_SettingsReg, (void**) &piSettings)) {
        char outbuf[ 32];
        int result;
        result = ISettings_Get(
            piSettings,
            "/myApp/myIniSettings/section1/setting1",
            outbuf,
            sizeof(buf),
            NULL
        );
        if (SUCCESS == result) {
            // outbuf will contain "value1"
        }
        ISettings_Release (piSettings);
        pSettings = NULL;
    }
}
```

The steps that developers take to add and access a public heap-based settings store to a component is very similar to the .ini file-based store. The main difference is the absence of the .ini file. Instead, heap-based settings require a quota value that determines the maximum amount of heap that may be used by the store. First, developers may register the store with the system by adding the following to a component's .cif file:

```
local s = require 'SettingsCIFHelpers'
-- register my settings at "/myApp/myHeapSettings/..."
s:RegisterHeap {
    owner = 0x12345678,      -- class ID of my component
    key = "/myApp/myHeapSettings",
    quota = 0x1000,
    acls = { ... }
}
```

Optionally developers may define ACLs to allow other apps access to their settings as follows:

```
acls = {
    {  -- grant everyone read access to my settings but write access to
       -- only those modules belonging to the 0xdeadd00d group
        {
            groups = { 0 },
            perms = "r/r",
        },
        {
            groups = { 0xdeadd00d },
            perms = "rw/rw",
        },
        path = "/myApp/myHeapSettings"
    }
}
```

Third, developers can use the following code within an application to access setting. Note that a heap-based setting does not exist until ISettings_Set( ) is called on it.

```
{
    ISettings *piSettings = NULL;
    if (SUCCESS == IEnv_CreateInstance(piEnv,
    AEECLSID_SettingsReg, (void**) &piSettings)) {
        char outbuf[ 32];
        int result;
        (void) ISettings_Set(piSettings,
            "/myApp/myIniSettings/foo", "bar");
        result = ISettings_Get(
            piSettings,
            "/myApp/myIniSettings/foo",
            outbuf,
            sizeof(buf),
            NULL
        );
        if (SUCCESS == result) {
            // outbuf will contain "bar"
        }
        ISettings_Release (piSettings);
        pSettings = NULL;
    }
}
```

In an embodiment developers can define a custom setting for an application that is public (i.e., accessible by all allocations) by perform the following to add a custom ISettings implementation into the settings registry: First, developers write a component that implements the embodiment registry. Second, developers register the component with the system by adding the following to the component's .cif file:

```
local s = require 'SettingsCIFHelpers'
s:RegisterClass {
        class = 0xdeadbeef,
        key = "/myApp/myCustomSettings",
}
```

Next, developers use the following code in the application to access the setting. Note that any ISettings operations performed on the registry class will be delegated to the custom class.

```
{
    ISettings *piSettings = NULL;
    if (SUCCESS == IEnv_CreateInstance(piEnv,
AEECLSID_SettingsReg, (void**) &piSettings)) {
            int nChildren = 0; int result;
            result = ISettings_GetNumChildren(piSettings,
"/myApp/myCustomSettings", &nChildren);
            if (SUCCESS == result) {
                    // do something
            }
            ISettings_Release (piSettings);
            pSettings = NULL;
    }
}
```

In an embodiment developers can define a private .ini file setting store for an application (i.e., accessible only be allocations specifically given permission to access the file) by perform the following. First developers copy the following into a file called mysettings.ini and place it into the component's module directory in EFS:
[section1]
setting1=value1

Second, developers include the following code in the application to enable it to access the setting:

```
{
    ISettingsStoreFactory *piSSF = NULL;
    if (SUCCESS == IEnv_CreateInstance(piEnv,
AEECLSID_SettingsIniFactory, (void**) &piSSF)) {
            ISettings *piSettings = NULL;
            int result;
            result = ISettingsStoreFactory_Create(
                    piSSF,
                    "owner=0x12345678,path=mysettings.ini",
                    &piSettings
            );
            if (SUCCESS == result) {
                    char outbuf[ 32];
                    result = ISettings_Get(
                            piSettings,
                            "section1/setting1",
                            outbuf,
                            sizeof(buf),
                            NULL
                    );
                    if (SUCCESS == result) {
                            // outbuf will contain "value1"
                    }
                    ISettings_Release (piSettings);
                    pSettings = NULL;
            }
            ISettingsStoreFactory_Release (piSSF);
            piSSF = NULL;
    }
}
```

Note that unlike public settings, access to the private store does not require the prefix "/myApp/myIniSettings".

The steps that developers take to implement a private heap-based settings store in an application component are very similar to the .ini file-based store except that there is no reference to an .ini file. Instead, heap-based settings require a quota value that determines the maximum amount of heap storage that may be used by the store. Developers can use the following code in an application to access the setting. Note that a heap-based setting does not exist until ISettings_Set( ) is called on it.

```
{
    ISettingsStoreFactory *piSSF = NULL;
    if (SUCCESS == IEnv_CreateInstance(piEnv,
AEECLSID_SettingsHeapFactory, (void**) &piSSF)) {
            ISettings *piSettings = NULL;
            int result;
            result = ISettingsStoreFactory_Create(
                    piSSF,
                    "quota=0x1000",
                    &piSettings
            );
            if (SUCCESS == result) {
                    char outbuf[ 32];
                    (void) ISettings_Set(piSettings, "foo/bar",
                    "Hello world");
                    result = ISettings_Get(piSettings, "foo/bar",
outbuf, sizeof(buf), NULL);
                    if (SUCCESS == result) {
                            // outbuf will contain "Hello world"
                    }
                    ISettings_Release (piSettings);
                    pSettings = NULL;
            }
            ISettingsStoreFactory_Release (piSSF);
            piSSF = NULL;
    }
}
```

In an embodiment developers can define a private custom setting store by performing the following to access a custom ISettings implementation. First, developers write a component that implements ISettings. Second, developers include the following code in an application to access the private custom setting.

```
{
    ISettings *piSettings = NULL;
    if (SUCCESS == IEnv_CreateInstance(piEnv, <classid>, (void**)
&piSettings)) {
            int nChildren = 0;
            int result;
            result = ISettings_GetNumChildren(piSettings,
"/path/to/my/settings", &nChildren);
            if (SUCCESS == result) {
                    // do something }
            ISettings_Release (piSettings);
            pSettings = NULL;
    }
}
```

Figure 7:
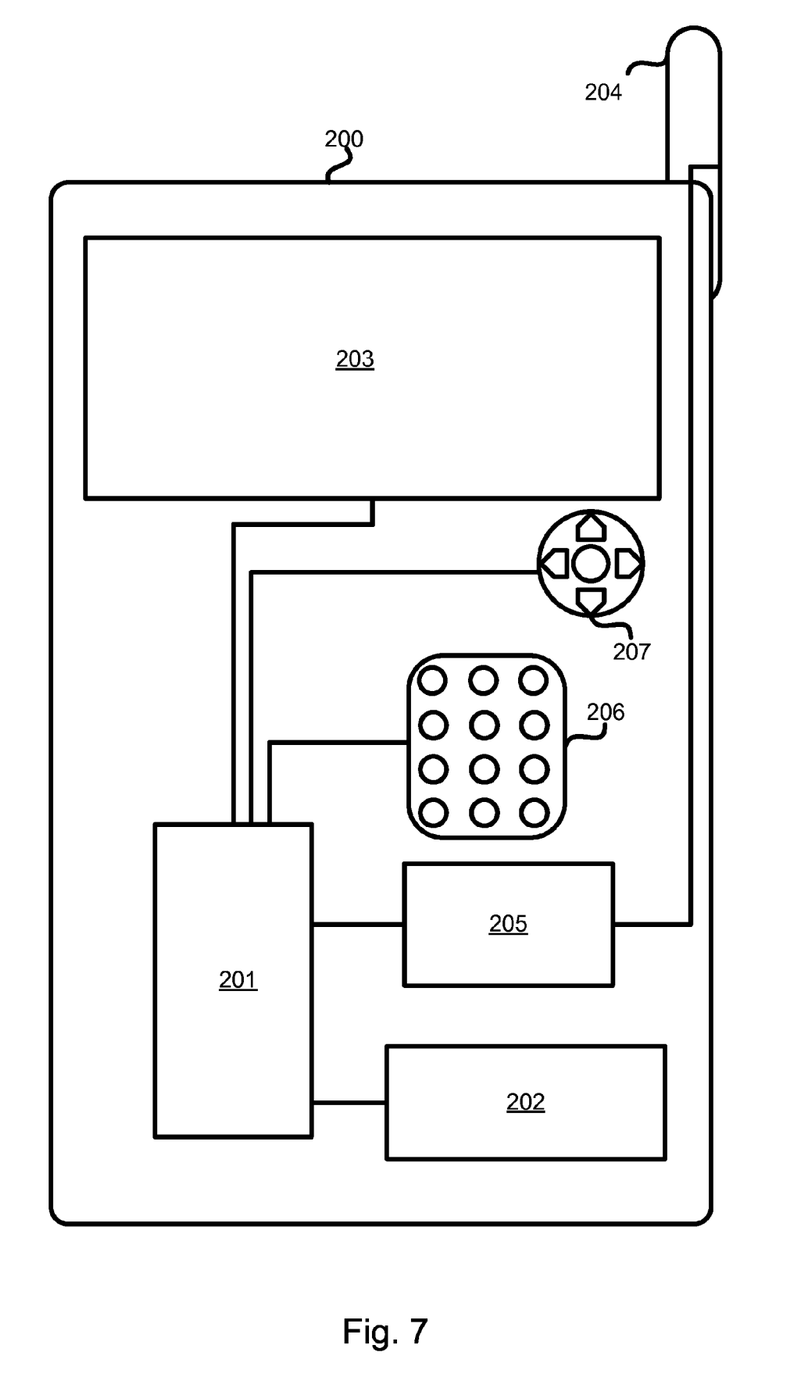
FIG. 7 is a component block diagram of mobile handsets suitable for implementing the various embodiments.

The embodiments described above may be implemented on any of a variety of mobile devices, such as, for example, cellular telephones, personal data assistants (PDA) with cellular telephone, mobile electronic mail receivers, mobile web access devices, and other processor equipped devices that may be developed in the future. In addition, the embodiments described above may be implemented on any of a variety of computing devices, including but not limited to desktop and laptop computers. FIG. 7 depicts various components of a mobile device 200 capable of supporting the various embodiments disclosed herein. A typical mobile handset 200 includes a processor 201 coupled to internal memory 202 and a user interface display 203. The mobile handset 10 may include an antenna 204 for sending and receiving electromagnetic radiation that is connected to a wireless data link and/or cellular telephone transceiver 205 coupled to the processor 201. In some implementations, the transceiver 205, and portions of the processor 201 and memory 202 used for cellular telephone communications are referred to as the air interface since the combination provides a data interface via a wireless data link. Mobile handsets typically include a key pad 206 and menu selection buttons or rocker switches 207 for receiving user inputs.

The processor 201 may be any programmable microprocessor, microcomputer or multiple processor chip or chips that can be configured by software instructions (applications) to perform a variety of functions, including the functions of the various embodiments described above. In some mobile devices, multiple processors 201 may be provided, such as one processor dedicated to wireless communication functions and one processor dedicated to running other applications. Typically, software applications may be stored in the internal memory 202 before they are accessed and loaded into the processor 201. In some mobile devices, the processor 201 may include internal memory sufficient to store the application software instructions. For the purposes of this description, the term memory refers to all memory accessible by the processor 201, including internal memory 202 and memory within the processor 201 itself. The memory 202 may be volatile or nonvolatile memory, such as flash memory, or a mixture of both.

The hardware used to implement the foregoing embodiments may be processing elements and memory elements configured to execute a set of instructions, wherein the set of instructions are for performing method steps corresponding to the above methods. Alternatively, some steps or methods may be performed by circuitry that is specific to a given function.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

What is claimed is:

1. A method for storing and accessing software settings within a registry, comprising:
    creating a native node of a native data store by generating a native settings object containing a settings value;
    storing the native settings object in memory with a key using a first file type, wherein the native data store is associated with the first file type, and wherein the first file type is supported by the registry;
    registering the native node with the registry;
    receiving a non-native node of a non-native data store, wherein the non-native data store is associated with a second file type that is not supported by the registry;
    registering the non-native node with the registry using a class identifier for a custom registry class;
    receiving a request for settings data from an application in the form of an application programming interface (API) call;
    determining whether the requested settings data is in the native node or the non-native node; and
    implementing a singleton service associated with the registry to obtain the settings value in response to determining that the requested settings data is in the native node, wherein;
        the singleton service obtains the requested settings data from the native settings object within the singleton service;
        the singleton service returns the obtained settings data to the API; and
        the obtained settings data is returned to the application from the API.

2. The method of claim 1, wherein the singleton service controls all accesses to native settings objects.

3. The method of claim 1, further comprising:
    implementing a non-native process for obtaining the requested settings data in response to determining that that the requested settings data is in the non-native node.

4. The method of claim 1, further comprising:
    determining whether the application satisfies a privilege specified in the native settings object in response to determining that the requested settings data is in the native node; and
    denying access to the settings data in response to determining that the application does not satisfy the privilege specified in the native settings object.

5. The method of claim 4, further comprising defining the privilege when the native settings object is generated.

6. A mobile device, comprising:
a processor;
a memory coupled to the processor;
wherein the processor is configured with processor-executable instructions to perform steps comprising:
creating a native node for a native data store by generating a native settings object containing a settings value;
storing the native settings object in memory with a key using a first file type, wherein the native data store is associated with the first file type, and wherein the first file type is supported by the registry;
registering the native node with the registry;
receiving a non-native node of a non-native data store, wherein the non-native data store is associated with a second file type that is not supported by the registry;
registering the non-native node with the registry using a class identifier for a custom registry class;
receiving a request for settings data from an application in the form of an application programming interface (API) call;
determining whether the requested settings data is in the native node or in the non-native node; and
implementing a singleton service associated with the registry to obtain the settings value in response to determining that the requested settings data is in the native node, wherein;
the singleton service obtains the settings data from the native settings object within the singleton service;
the singleton service returns the obtained settings data to the API; and
the obtained settings data is returned to the application from the API.

7. The mobile device of claim 6, wherein the processor is further configured with processor-executable instructions such that the singleton service controls all accesses to native settings objects.

8. The mobile device of claim 6, wherein the processor is further configured with processor-executable instructions to perform steps further comprising:
implementing a non-native process for obtaining the requested settings data in response to determining that that the requested settings data is in non-native node.

9. The mobile device of claim 6, wherein the processor is further configured with processor-executable instructions to perform steps further comprising:
determining whether the application satisfies a privilege specified in the native settings object in response to determining that the requested settings data is in the native node; and
denying access to the settings data in response to determining that the application does not satisfy the privilege specified in the native settings object.

10. The mobile device of claim 9, wherein the processor is configured with processor-executable instructions to perform steps further comprising defining the privilege when the native settings object is generated.

11. A non-transitory computer-readable storage medium having stored thereon processor-executable instructions configured to cause a processor of a computing device to perform steps comprising:
creating a native node in a native data store by generating a native settings object containing a settings value;
storing the native settings object in memory with a key using a first file type, wherein the native data store is associated with the first file type, and wherein the first file type is supported by the registry;
registering the native node with the registry;
receiving a non-native node of a non-native data store, wherein the non-native data store is associated with a second file type that is not supported by the registry;
registering the non-native node with the registry using a class identifier for a custom registry class;
receiving a request for settings data from an application in the form of an application programming interface (API) call;
determining whether the requested settings data is in a native node or in a non-native node; and
implementing a singleton service associated with the registry to obtain the settings value in response to determining that the requested settings data is in the native node, wherein;
the singleton service obtains the settings data from the native settings object within the singleton service;
the singleton service returns the obtained settings data to the API; and
the obtained settings data is returned to the application from the API.

12. The non-transitory computer-readable storage medium of claim 11, wherein the stored processor-executable instructions are configured to cause the processor to perform steps such that the singleton service controls all accesses to native settings objects.

13. The non-transitory computer-readable storage medium of claim 11, wherein the stored processor-executable instructions are configured to cause the processor to perform steps further comprising:
implementing a non-native process for obtaining the requested settings data in response to determining that the requested settings data is in a non-native node.

14. The non-transitory computer-readable storage medium of claim 11, wherein the stored processor-executable instructions are configured to cause the processor to perform steps further comprising:
determining whether the application satisfies a privilege specified in the native settings object in response to determining that the requested settings data is in the native node; and
denying access to the settings data in response to determining that the application does not satisfy the privilege specified in the native settings object.

15. The non-transitory computer-readable storage medium of claim 14, wherein the stored processor-executable instructions are configured to cause the processor to perform steps further comprising defining the privilege when the native settings object is generated.

16. A mobile device, comprising:
means for creating a native node in a native data store by generating a native settings object containing a settings value;
means for storing the native settings object in memory with a key using a first file type, wherein the native data store is associated with the first file type, and wherein the first file type is supported by the registry;
registering the native node with the registry;
means for receiving a non-native node of a non-native data store, wherein the non-native data store is associated with a second file type that is not supported by the registry;
means for registering the non-native node with the registry using a class identifier for a custom registry class;
means for receiving a request for settings data from an application in the form of an application programming interface (API) call;

means for determining whether the requested settings data is in the native node or in a non-native node; and means for implementing a singleton service associated with the registry to obtain the settings value in response to determining that the requested settings data is in the native node, wherein:

the singleton service obtains the settings data from the native settings object within the singleton service;

the singleton service returns the obtained settings data to the API; and the obtained settings data is returned to the application from the API.

17. The mobile device of claim 16, wherein means for implementing the singleton service includes means for controlling all accesses to native settings objects.

18. The mobile device of claim 16, further comprising:
implementing a non-native process for obtaining the requested settings data in response to determining that the requested settings data is in the non-native node.

19. The mobile device of claim 16, further comprising:
means for determining whether the application satisfies a privilege specified in the native settings object in response to determining that the requested settings data is in the native node; and means for denying access to the settings data in response to determining that the application does not satisfy the privilege specified in the native settings object.

20. The mobile device of claim 19, further comprising means for defining the privilege when the native settings object is generated.

* * * * *

UNITED STATES PATENT AND TRADEMARK OFFICE
CERTIFICATE OF CORRECTION

| | |
|---|---|
| PATENT NO. | : 8,667,512 B2 |
| APPLICATION NO. | : 12/551498 |
| DATED | : March 4, 2014 |
| INVENTOR(S) | : Michael Mager et al. |

It is certified that error appears in the above-identified patent and that said Letters Patent is hereby corrected as shown below:

TITLE PAGE:

Item (75), Inventor, please add the following inventors. -- John D. BOYD, San Diego, CA (US), Michael J. VINES, San Diego, CA, (US), Robert G. WALKER, San Diego, CA (US) --.

Signed and Sealed this
Eighth Day of September, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,667,512 B2 | Page 1 of 1 |
| APPLICATION NO. | : 12/551498 | |
| DATED | : March 4, 2014 | |
| INVENTOR(S) | : Michael Mager et al. | |

It is certified that error appears in the above-identified patent and that said Letters Patent is hereby corrected as shown below:

TITLE PAGE:

Item (12), --Mager-- should read "Mager et al.".

Item (75), Inventor, please add the following inventors. -- John D. BOYD, San Diego, CA (US), Michael J. VINES, San Diego, CA, (US), Robert G. WALKER, San Diego, CA (US) --.

This certificate supersedes the Certificate of Correction issued September 18, 2015.

Signed and Sealed this
Twenty-fourth Day of November, 2015

Michelle K. Lee
*Director of the United States Patent and Trademark Office*